United States Patent [19]

Nakahama

[11] 4,403,512

[45] Sep. 13, 1983

[54] SERVO-TYPE CAPSULE-EQUIPPED INSTRUMENT

[75] Inventor: Kazushi Nakahama, Komae, Japan

[73] Assignee: Tokyo Aircraft Instrument Co. Ltd., Tokyo, Japan

[21] Appl. No.: 269,785

[22] Filed: Jun. 2, 1981

[30] Foreign Application Priority Data

Jan. 6, 1981 [JP] Japan ................................. 56-947

[51] Int. Cl.$^3$ ........................... G01L 7/12; G01L 9/00
[52] U.S. Cl. ........................................ 73/701; 73/387; 73/705
[58] Field of Search ................. 73/384, 386, 387, 701, 73/705, DIG. 11

[56] References Cited

U.S. PATENT DOCUMENTS

3,286,529 11/1966 Damrel, Jr. et al. ................. 73/705
3,867,680 2/1975 King ..................................... 73/387
4,054,052 10/1977 Nakahama ........................... 73/430

Primary Examiner—Donald O. Woodiel
Attorney, Agent, or Firm—Spencer & Kaye

[57] ABSTRACT

A servo instrument, particularly a servo altimeter, with a minimum of display error. The instrument comprises a capsule assembly, a sector adapted for rotation corresponding to the displacement of the capsule assembly, a photosensor for producing an output showing its angular position relative to the sector, a support for rotating the photosensor while supporting it adjustably in a direction of tracing the sector, a cam adapted to make the amount of the adjustment of the photosensor variable by the position of the support, a motor, means for generating a signal showing the rotating positional angle of the motor, and an amplifier for amplifying the output of the photosensor and driving the motor so as to maintain the output of the photosensor constant.

11 Claims, 16 Drawing Figures

SERVO-TYPE CAPSULE-EQUIPPED INSTRUMENT

BACKGROUND OF THE INVENTION

1. Field of the Invention

This invention relates to a servo-type capsule-equipped instrument that can be utilized conveniently as an altimeter of an aircraft. More specifically, it relates to a servo-type capsule-equipped instrument having an error correcting mechanism, which is improved so as to remove errors arising from the inherent properties of the capsule and obtain a highly accurate display or output.

2. Description of the Prior Art

There are widely used capsule-equipped instruments which are adapted to indicate on an enlarged scale an axial deformation of the capsule which is caused by a difference in pressure between the inside and outside of the capsule.

An altimeter of the simplest structure is constructed so as to convert the axial change of the capsule into a change in the rotating direction, then enlarge this change and indicate it by a pointer.

In displaying, the deflecting angle of the pointer is desirably proportional to the altitude. To achieve this, efforts have long been directed to improvement of the properties of the capsule and the characteristics of the angle conversion device. Since, however, it is difficult to obtain capsule having ideal properties for an equiangular display of altitude and the properties vary from capsule to capsule, the actual situation is that errors corresponding to the altitude are allowed in the display.

Figure 1:
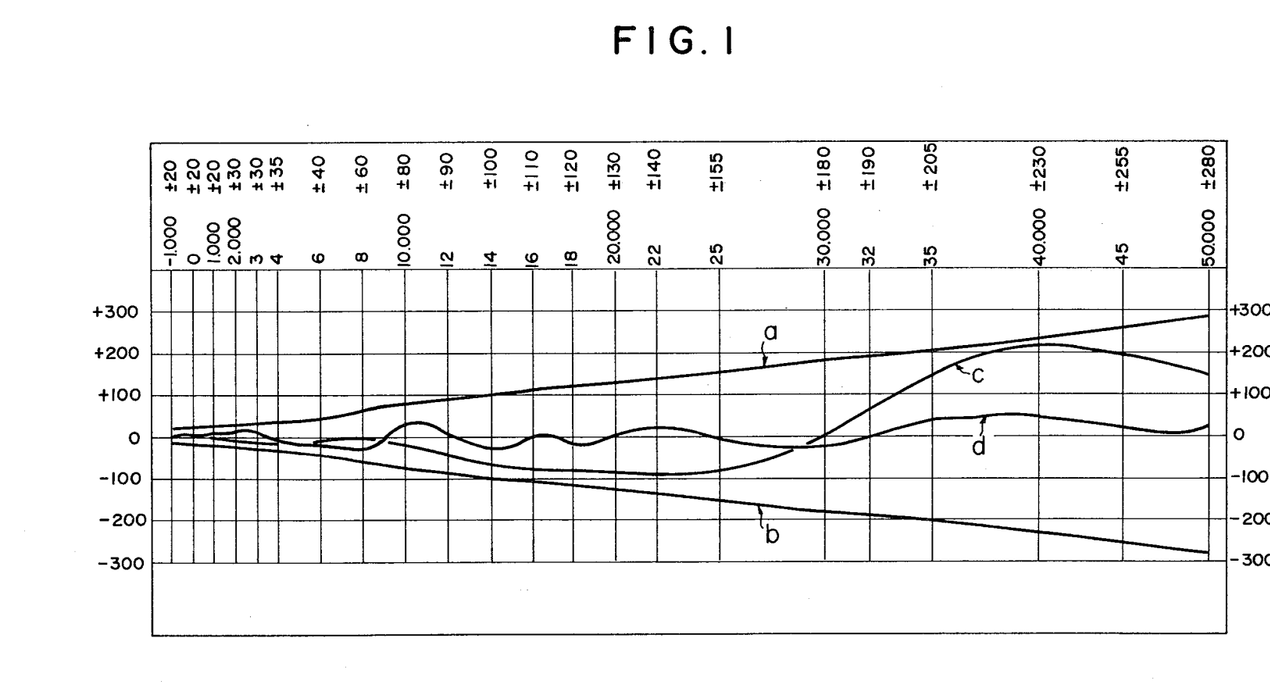
FIG. 1 is a graphic representation comparatively showing the characteristics of a conventional altimeter and the characteristics of the altimeter of the invention in one embodiment thereof.

FIG. 1 of the accompanying drawings is a graph showing the allowable range of display errors and one example of the characteristics of a conventional altimeter. In FIG. 1, the polygonal line a shows the allowable positive upper limit; the polygonal line b, the allowable lower limit; and the polygonal line c, one example of the characteristics of the conventional altimeter.

Instrument manufacturers are trying to obtain altimeters of high accuracy by selecting a capsule and adjusting the coupling between it and a converter. In the example shown in FIG. 1, a relatively correct display is obtained in a low altitude region and in the vicinity of 9,114 meters (30,000 feet), but considerable errors, although within the allowable limits, remain in the vicinity of 6,096 meters (20,000 feet) and in the vicinity of 120,192 meters (40,000 feet).

It is extremely difficult to reduce such errors by improving the properties of the capsule.

Such errors should desirably be minimized when the altimeter is to be operated by servomechanisms to feed information to an automatic pilot of an aircraft.

SUMMARY OF THE INVENTION

It is a first object of this invention to provide a servo-type capsule-equipped instrument improved so as to minimize errors caused by the aforesaid characteristics of the capsule and to produce an output signal corresponding exactly to a difference in pressure.

A second object of the invention is to provide a servo-type capsule-equipped instrument capable of reducing errors caused by the aforesaid characteristics of the capsule and making a display corresponding exactly to a difference in pressure.

Another specific object of the invention is to provide servo-type capsule-equipped instruments in which the aforesaid errors are reduced at each of many measuring points for respective capsules whose characteristics differ from instrument to instrument.

In order to achieve the above objects, the present invention provides a servo-type capsule-equipped instrument having an error correcting mechanism, comprising at least one capsule, a sector adapted for rotation corresponding to the displacement of the capsule, a photosensor for producing an output showing its angular position relative to the sector, a support for rotating the photosensor while supporting it adjustably in a direction of tracing the sector, a cam adapted so as to make the amount of the adjustment of the photosensor variable by the position of the support, a motor, means for generating a signal showing the rotating positional angle of the motor, and an amplifier for amplifying the output of the photosensor and driving the motor so as to maintain the output of the photosensor constant.

DETAILED DESCRIPTION OF THE PREFERRED EMBODIMENTS

The preferred embodiments of the servo-type capsule-equipped instrument in accordance with this invention are described in detail below with reference to the accompanying drawings showing the altimeter of this invention.

The casing of the altimeter in accordance with this invention is divided into an instrument chamber 9 and a pressure chamber 1.

Figure 3:
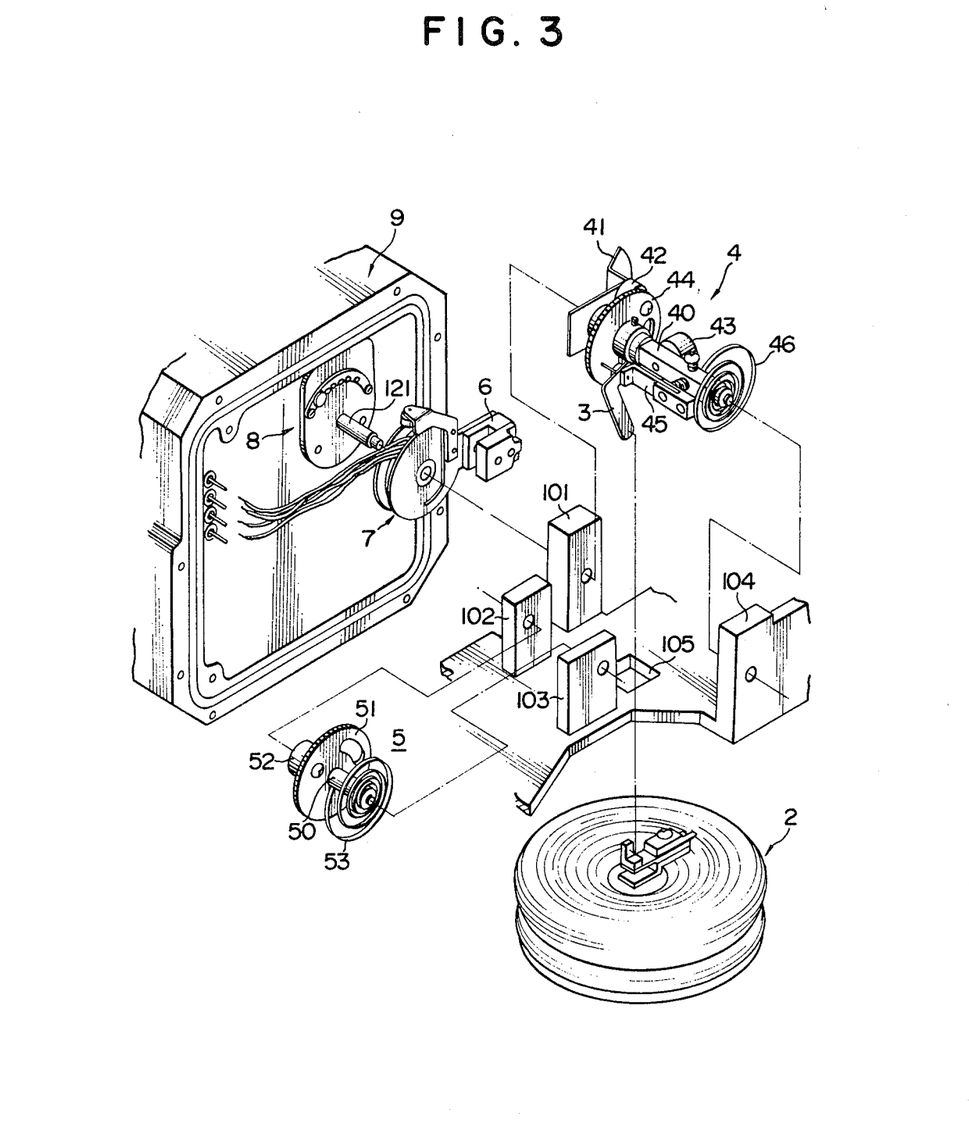
FIG. 3 is an exploded perspective view showing the construction of the inside of a pressure chamber of the altimeter.

A static pressure line is connected to the pressure chamber 1, and a capsule assembly 2 is disposed within the pressure chamber 1. As shown in FIG. 3, the capsule assembly 2 is a double capsule assembly which, as well known, is an aneroid-type capsule assembly composed of Be-Cu containers evacuated to $10^{-5}$ mmHg. A displacement of the capsule assembly which occurs in its axial direction is converted into a change in angle by an L-shaped rocking lever 3 and transmitted to a rocking shaft assembly 4. The lower end of the rocking lever 3 is coupled to a pin at the connecting part of the capsule assembly 2, and its upper end is coupled to an auxiliary arm 45 of the rocking shaft assembly 4. The angular conversion characteristic can be adjusted by adjusting the distance between the auxiliary arm 45 and a rocking shaft 40. The rocking shaft 40 is rotatably supported on studs 101 and 104 within the pressure chamber 1. To the rocking shaft 40 is secured one end of a hair spring 46 whose other end is set at a fixed position within the pressure chamber 1. A gear 44 and a sector 41 are further fixedly secured to the rocking shaft 40. In the illustrated embodiment, an acceleration compensating assembly 5 is provided within the pressure chamber 1 for preventing influences of various accelerations which may be exerted on the capsule assembly 2. A shaft 50 of the assembly 5 is supported rotatably on studs 102 and 103, and a gear 51 is mounted integrally to the shaft 50. A hair spring 53 is placed across the shaft 50 and a fixed position within the pressure chamber 1. The gear 51 is in meshing engagement with the gear 44 of the rocking assembly 4. A weight 52 provided on the gear 51 and a weight 42 provided on the gear 44 serve for the purpose of acceleration compensation. A weight 43 provided on the rocking shaft 40 serves to maintain the static balance of the rocking shaft assembly 4.

The theory of acceleration compensation is described in detail in U.S. Pat. No. 4,054,052 granted to the present inventor. The principal part of the present invention, i.e. the sector 41 fixedly secured to the rocking shaft assembly 4, is effectively freed from influences of the posture of the instrument and influences of acceleration exerted on the instrument, and is rotated in correspondence with the expansion of the capsule assembly 2. If, however, the angle of rotation is displayed directly, the display contains an error related to the properties of the capsule itself and to angle conversion as described hereinabove. Even when a servo output corresponding to the angle of rotation is produced by using a servomechanism, the resulting display likewise contains an error.

A photosensor 6 for tracing the sector 41 is provided within the pressure chamber 1. The photosensor 6 is fixed to a support assembly 7 fixed to a drive shaft 121 protruding from the instrument chamber 9. Furthermore, within the pressure chamber 1 is provided a cam assembly 8 for deforming the support assembly 7 to correct the angular position of the photosensor 6 relative to the shaft 121.

Figure 10A:
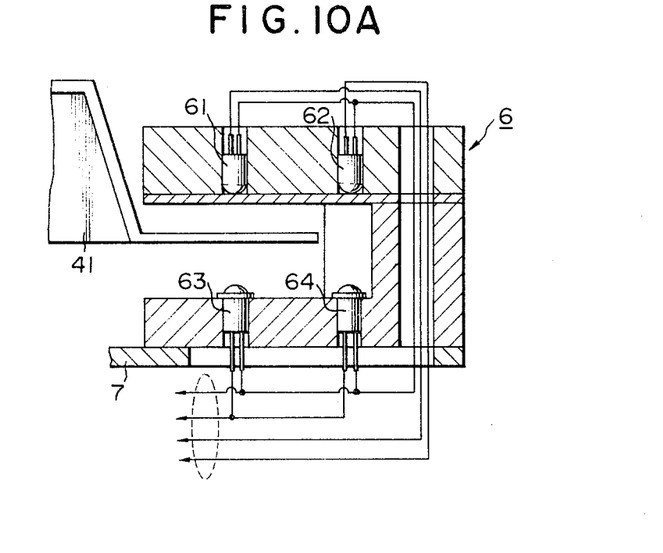
FIGS. 10(A), 10(B), 10(C) and 10(D) are rough illustrations for explaining the relation between the photosensor and the sector.

The photosensor assembly 6, as shown in FIG. 10(A), includes phototransistors 61 and 62 provided at its upper portion and light-emitting diodes (LED) 63 and 64 provided at its lower portion. The optical axis of the phototransistor 61 is in alignment with that of the LED 63, and the optical axis of the phototransistor 62 is in alignment with that of the LED 64. The set of elements 61 and 63 are used to sense the edge of the sector 41, and the set of elements 62 and 64, for setting the sensing level. Terminals on one side each of the elements 61, 62, 63 and 64 are connected to a common wire. Wires are provided for taking out sensed outputs from the phototransistors 61 and 62 respectively, and also a common power supply wire is connected to the light-emitting diodes 63 and 64. Thus, four connecting wires in total are led out from the photosensor assembly 6. These wires are loosely wound around a drum of the support assembly 7, and connected respectively to terminals (see FIG. 3) led out from the instrument chamber 9.

Figure 4:
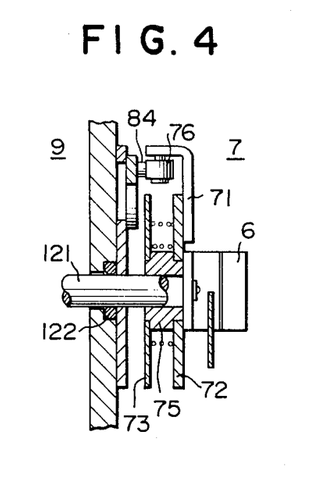
FIG. 4 is a sectional view showing the relation between a cam assembly and a support assembly.
Figure 6:
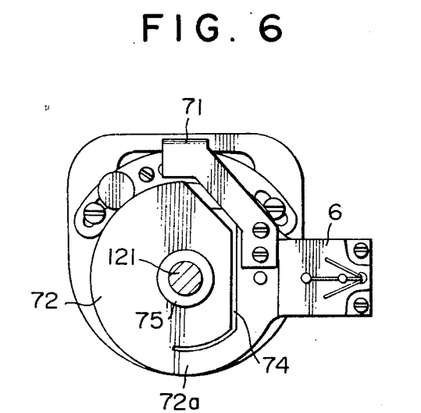
FIG. 6 is a top plan view showing the cam assembly and the support assembly.
Figure 7:
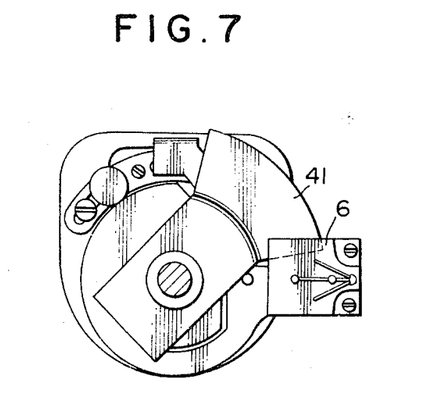
FIG. 7 is a top plan view showing the relation among the cam assembly, the support assembly and a sector.

The support assembly 7 is supported integrally on the drive shaft 121 to which the rotation of a servo motor 10 to be described hereinbelow is transmitted (see FIGS. 4 and 6).

Disks 72 and 73 are fixed to a fixing sleeve 75, forming a bobbin for the aforesaid group of lead wires. The disk 72 is made by fabricating an elastic plate, and has provided therein a cut groove 74 as shown in FIG. 6. To one (right side in FIG. 6) of the sections of the disk 72 divided by the cut groove 74 are fixedly secured a roller arm 71 and the photosensor assembly 6. The roller arm 71 has a roller 76 adapted for contact with the cam surface of the cam assembly 8 to be described in detail hereinbelow. A section 72a of the disk 72 resulting from division by the cut groove 74 is elastically deformed according to the level of the roller 76 to incline the optical axis of the photosensor 6.

Figure 5A:
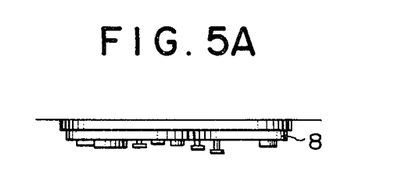
FIG. 5(A) is a rear view of the cam assembly.
Figure 5B:
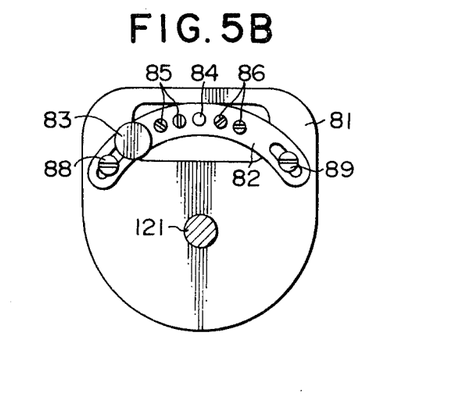
FIG. 5(B) is a top plan view of the cam assembly.

The cam assembly 8 includes a base plate 81, a pin table 82 and cam pins 83, 84, 85 and 86 (see FIG. 5(B)). The base plate 81 is fixed to the wall surface of the pressure chamber 1, and the shaft 121 for driving the support assembly extends centrally through the base plate 81. This base plate 81 concurrently serves as a support member for an O-ring 122 (see FIG. 4) sealing the pressure chamber 1 and the instrument chamber air-tight. The pin table 82, arcuate in shape, is fixed to the base plate 81 by means of screws 88 and 89. Fixed pins 83 and 84 and adjusting cam pins 85, 85, 86, 86 are provided on the pin table 82. The fixed pin 83 represents a standard altitude of 0 meter (0 foot), and the fixed pin 84 represents a standard altitude of 9,114 meters (30,000 feet). The cam pins 85, 85 are adapted to be set at an arbitrary height for adjustment of altitude between 0 and 9,114 meters, and the pins 86, 86, are used to adjust an altitude exceeding 9,114 meters. Although two fixed pins and four adjusting cam pins are used in this embodiment, it is to be understood that the number of these pins can be changed as desired according to the intended accuracy, etc.

Figure 2:
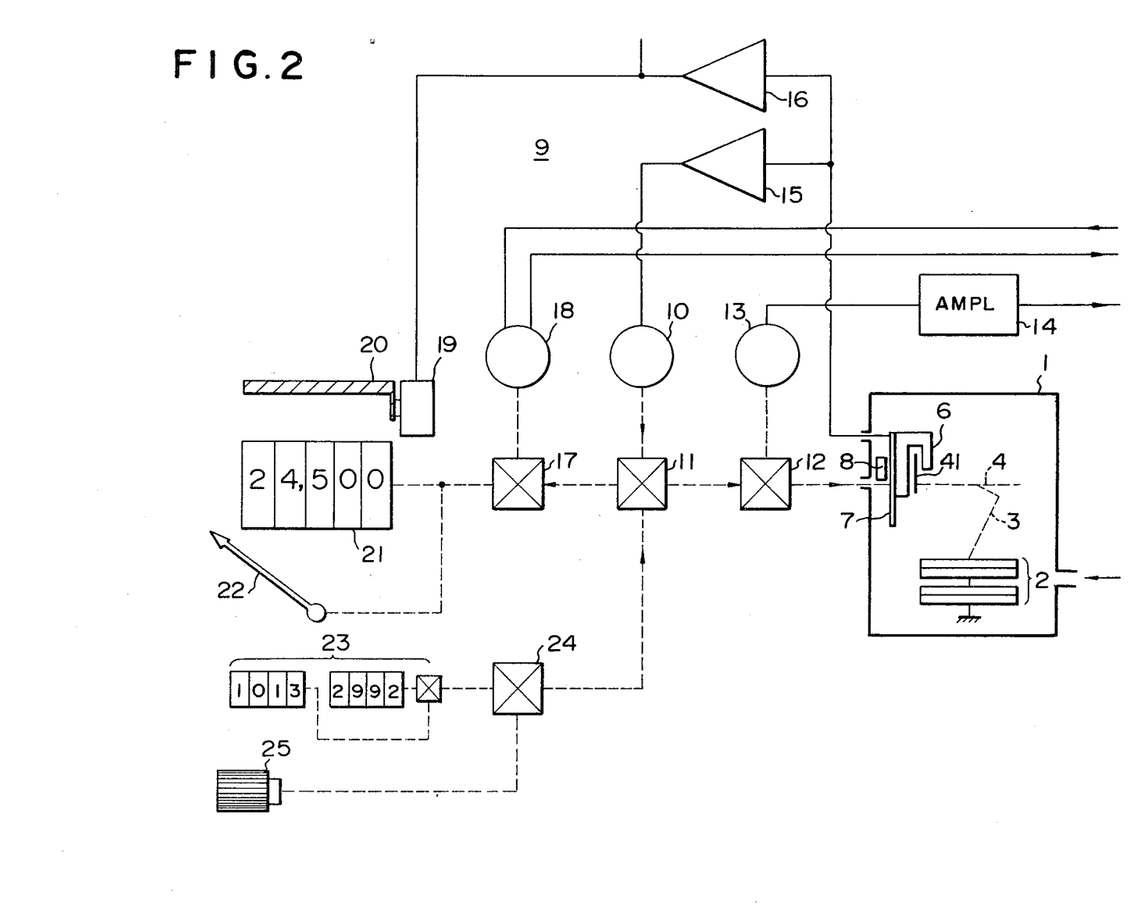
FIG. 2 is a schematic view showing the general construction of an altimeter as an embodiment of the instrument in accordance with the invention.
Figure 10B:
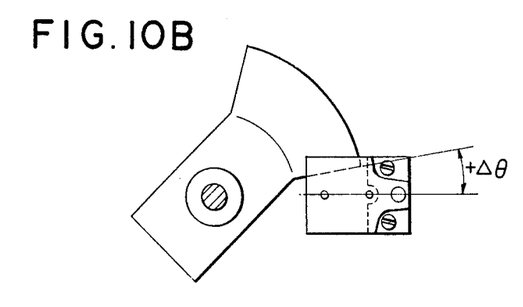
Figure 10C:
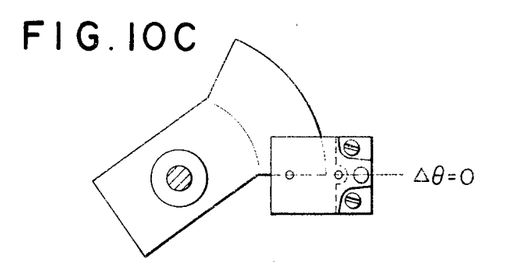
Figures 10D, 11:
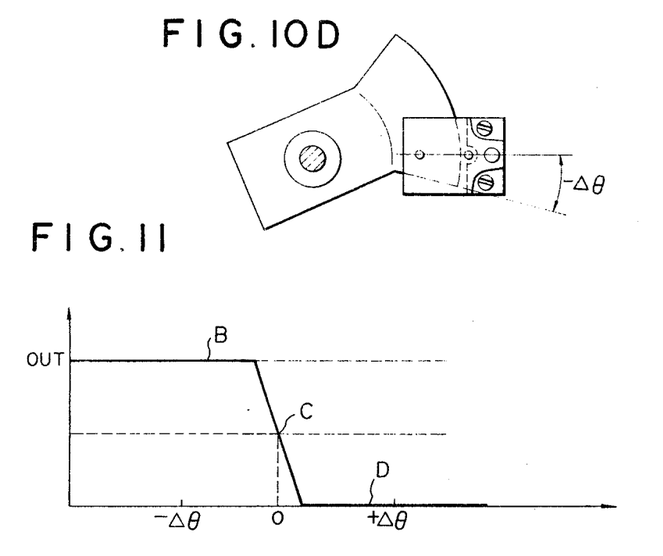
FIG. 11 is a schematic diagram for explaining outputs produced by the photosensor.

The outputs of the phototransistors in the photosensor assembly 6 are led to the instrument chamber 9, and supplied to a servo amplifier 15 and a monitor amplifier 16 (see FIG. 2). The output of the phototransistor 61 of the photosensor assembly 6 changes in relation to the sector 41. When the phototransistor 61 and the LED 63 are scarcely covered by the sector 41 as shown in FIG. 10(B), a high level of output is obtained as shown by (B) in FIG. 11. When these elements are almost completely covered by the sector 41 as shown in FIG. 10(D), a low level of output is obtained as shown by (D) in FIG. 11. When, as shown in FIG. 10(C), one half of the light flux from the LED 63 is shut out, the output of the phototransistor 61 is equal to one-second of the sum of the aforesaid outputs of high and low levels. The servo system in accordance with this invention exercises control in such a way as to maintain this condition shown by (C) in FIG. 11. Specifically, the servo amplifier 15 drives the servo motor 10 and rotates the shaft 121, so that the state shown in FIG. 10(C) is established. The rotation of the servo motor 10 is divided into a displaying direction and a mechanical feedback direction by means of a gear group 11 including differential gears. The rotation in the mechanical feedback direction is transmitted to the drive shaft 121 for the support via a gear train 12. An encoder 13 is coupled to part of the gear train 12 so as to detect an output corresponding to the amount of the rotation of the shaft 121. This output is amplified by an encoder amplifier 14.

An ordinary altimeter is provided with a device for setting the barometric pressure of an airfield from or on which an aircraft takes off or lands and displaying the level of the airfield at zero. In FIG. 2, a barosetting knob 25 is provided in the front surface of the instrument chamber 9. The barometric pressure set by this knob is transmitted to a counter 23 for displaying the barometric pressure through a transmission gear assembly 24 to display the set barometric pressure. In the meantime, the set barometric pressure is transmitted from the transmission gear assembly 24 to the differential gear assembly 11 from which it is transmitted to an output transmission gear train 17 of the servo motor. This gear train drives a drum counter 21 for altitude display, and the altitude is displayed by a counter coupled to the gear train. These displays are made in consideration of the barometric pressure of the airfield, as stated above. A potentiometer 18 is connected to the gear train 17 for producing an electrical signal corresponding to the aforesaid display.

The output of the photosensor, as stated hereinabove, is also connected to the monitor amplifier 16. When the monitor amplifier 16 receives from the photosensor an output of the high level or low level shown in FIG. 11 which indicates that the sector cannot be traced, it actuates a torquer 19 to cover the surface of the counter 21 with a warning flag 20, thus showing that a normal display is not effected.

Figure 9A:
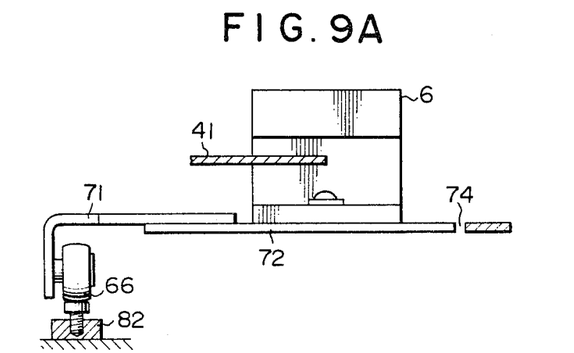
FIGS. 9(A) and 9(B) are rough illustrations of a photosensor in the adjusted state.
Figure 9B:
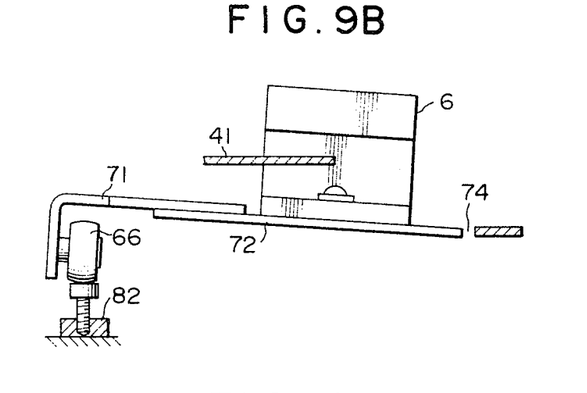

Now, with main reference to FIGS. 1 and 9, the correction of the characteristics of an altimeter is described. For an easy understanding, the following description is directed to a servo-type altimeter having the characteristics shown in (c) of FIG. 1.

As is seen from FIG. 1, the characteristics represented by (c) show that between 0 and 30,000 feet, the display has a negative error from the true altitude, and over 30,000 feet, the display has a positive error. Accordingly, no correction is required at 0 and 30,000 feet. Thus, the heights of the cam pins 83 and 84 corresponding to these altitudes are set so that the optical axis of the LED 63 and the phototransistor 61 is at right angles to the plane of the sector 41. FIG. 9(A) corresponds to this state. That a display having a positive error is made for altitudes exceeding 30,000 feet means that the expansion of the capsule is excessive for a change in barometric pressure. This can therefore be corrected by displaying an altitude lower than that corresponding to the position of the sector 41 which has been reached by rotation. To achieve this, the cam pins 86,86 corresponding to altitudes above 30,000 feet are set higher than the pin 84. As a result, the photosensor 6 is inclined as shown in FIG. 9(B). In this state, the light flux comes into the phototransistor 61 in an amount larger than the standard amount, and therefore, the servo motor 10 is rotated in a direction in which this amount is adjusted to the standard amount. Thus, in FIG. 9(B), the photosensor 6 moves to the left to keep the feedback system in equilibrium. This means a display of an altitude corresponding to a smaller angle than the angle shown by the sector 41.

For altitudes between 0 and 30,000 feet, the cam pins 85,85 are set lower than the fixed cam pins 83 and 84. As a result, the photosensor 6 is inclined in a direction opposite to the inclination shown in FIG. 9(B), and the light flux coming into the phototransistor 61 is decreased by the sector 41. Thus, the servo motor 10 moves the photosensor 6 to the right to maintain the feedback system in equilibrium. This means that an altitude higher than that corresponding to the indication of the sector 41 is displayed. By this adjustment of the cam pins, the indicating errors become zero for the respective altitudes.

The result of such adjustment is shown in FIG. 1, (d). At all altitudes, the errors are sufficiently small (within 60 feet) in comparison with the allowable values.

As stated in detail hereinabove, the present invention makes it possible to bring the indicating errors of a capsule-equipped instrument nearly close to zero.

Capsules tend to show common characteristics, but these characteristics vary from capsule to capsule. If the characteristics of a cam assembly are adjusted for each device, devices of high accuracy can be built within short periods of time without strictly investigating and adjusting the characteristics of the capsules themselves.

Figure 8:
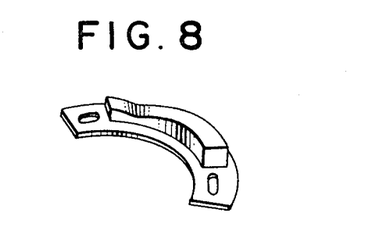
FIG. 8 is a perspective view showing a modified example of the cam assembly.

It is to be understood that various changes and modifications of the above-described embodiments are possible within the spirit and scope of the present invention. For example, the cam assembly may be a one-piece cam unit (see FIG. 8) fabricated from a plastic material.

The present invention including modifications should be construed to extend to all of the appended claims.

What is claimed is:

1. A servo-type capsule-equipped instrument having an error correcting mechanism, said instrument comprising
   at least one capsule,
   a sector adapted for rotation corresponding to the displacement of the capsule,
   a photosensor for producing an output corresponding to its angular position relative to the sector,
   a support for rotating the photosensor, said photosensor being supported adjustably by said support for tracing the sector,
   a cam adapted to make the amount of the adjustment of the photosensor variable in accordance with the position of the support,
   a motor having a shaft coupled to said support for the displacement thereof,
   means for generating a signal corresponding to the rotating positional angle of the shaft of said motor, and
   an amplifier having its input coupled to said photosensor and its output coupled to said motor, said amplifier amplifying the output of the photosensor and driving the motor so as to maintain the output of the photosensor constant.

2. The instrument of claim 1 wherein the support holds the photosensor in such a manner that the optical axis of the photosensor can be inclined, and the amount of adjustment is made variable by inclining the support by means of the cam.

3. The instrument of claim 1 wherein a photosensor-supporting portion of the support is an elastic plate, and by being deformed by the cam, the elastic plate supports the photosensor in such a manner that its optical axis can be inclined.

4. The instrument of claim 1 wherein the cam is an arcuate surface cam, and its height in the direction of the rotating shaft of the support corresponds to the amount of adjustment.

5. The instrument of claim 1 wherein the cam is composed of a base plate having a plurality of screw holes provided in an arcuate shape and a plurality of screws set respectively in the screw holes, and the cam surface is formed by adjusting the heights of the heads of the screws respectively.

6. The instrument of claim 4 wherein the curved surface of the cam is molded according to anticipated amounts of adjustment.

7. The instrument of claim 1 which is an altimeter.

8. The instrument of claim 7 which can be mounted on an aircraft having an automatic pilot.

9. The instrument of claim 1 wherein the photosensor is a photocoupler which is provided so that the light path is interrupted by the sector.

10. A servo-type capsule-equipped instrument having an error correcting mechanism, said instrument comprising at least one capsule,
a sector adapted for rotation corresponding to the displacement of the capsule,
a photosensor for sensing its angular position relative to the sector,
a support for supporting the photosensor adjustably in a tracing direction, said support rotating said sensor,
a cam fixed so as to make the amount of the adjustment of the photosensor variable in accordance with the position of the support,
a motor having a shaft coupled to said support for the displacement thereof,
a display means for indicating the rotating positional angle of the shaft of said motor, and
an amplifier having its input coupled to said photosensor and its output coupled to said motor, said amplifier amplifying an output of the photosensor and driving the motor so as to maintain the output of the photosensor constant.

11. The instrument of claim 10 wherein the display means is a drum counter adapted for driving by the motor.

* * * * *